US008180719B2

(12) United States Patent
Azami et al.

(10) Patent No.: US 8,180,719 B2
(45) Date of Patent: May 15, 2012

(54) PRINTER

(75) Inventors: Osamu Azami, Shiojiri (JP); Masayuki Kobayashi, Azumino (JP); Shigeyuki Takahashi, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 769 days.

(21) Appl. No.: 12/333,996

(22) Filed: Dec. 12, 2008

(65) Prior Publication Data

US 2009/0171877 A1  Jul. 2, 2009

(30) Foreign Application Priority Data

Dec. 27, 2007  (JP) .................................. 2007-336220

(51) Int. Cl.
*G06F 17/00* (2006.01)
*G06N 5/02* (2006.01)

(52) U.S. Cl. ........................................................ 706/46

(58) Field of Classification Search .................... None
See application file for complete search history.

(56) References Cited

U.S. PATENT DOCUMENTS

| | | | |
|---|---|---|---|
| 4,706,212 A * | 11/1987 | Toma | 704/2 |
| 5,788,388 A * | 8/1998 | Cowger et al. | 400/703 |
| 6,473,728 B1 * | 10/2002 | Tognazzini | 704/3 |
| 6,807,572 B1 * | 10/2004 | Yu | 709/219 |
| 7,202,967 B2 | 4/2007 | Fujimaki | |
| 2004/0179229 A1 * | 9/2004 | Laughlin | 358/1.15 |

FOREIGN PATENT DOCUMENTS

| | | |
|---|---|---|
| JP | 63041956 A | 2/1988 |
| JP | 02214963 A | 8/1990 |
| JP | 07-210343 | 8/1995 |
| JP | 09-190310 | 7/1997 |
| JP | 11-194907 | 7/1999 |
| JP | 2001147815 A | 5/2001 |
| JP | 2001-222396 | 8/2001 |
| JP | 2003-029946 | 1/2003 |
| JP | 2003246123 A | 9/2003 |
| JP | 2004-029994 | 1/2004 |
| JP | 2005-342945 | 12/2005 |

* cited by examiner

*Primary Examiner* — Kakali Chaki
*Assistant Examiner* — Peter Coughlan
(74) *Attorney, Agent, or Firm* — DLA Piper LLP (US)

(57) ABSTRACT

A printer includes a use status computation section which collects statistics of a use status of an analyzed print job and computes a use frequency and an execution interval of a language translation program based on a result of the statistics, and a resident mode switching section which causes a language translation program with a highest use frequency to initially stay resident in a memory and further causing a language translation program with a high use frequency and a long execution interval to stay resident next to the language translation program with the highest use frequency in the memory.

5 Claims, 12 Drawing Sheets

|          | NUMBER OF JOBS | NUMBER OF PAGES | AVERAGE |
|----------|----------------|-----------------|---------|
| ESC/Page | 519            | 3167            | 6.10    |
| PCL5     | 22             | 54              | 2.45    |
| PCL6     | 126            | 451             | 3.58    |
| PS3      | 57             | 74              | 1.30    |
| ESC/P2   | 5              | 12              | 2.40    |
| FX       | 0              | 0               | 0.00    |
| I1239X   | 0              | 0               | 0.00    |
| Other    | 6              | 8               | 1.33    |
| Total    | 735            | 3766            | 5.12    |

FIG. 3

|          | NUMBER OF JOBS | LOADED | AVERAGE |
|----------|----------------|--------|---------|
| ESC/Page | 519            | 175    | 2.97    |
| PCL5     | 22             | 18     | 1.22    |
| PCL6     | 126            | 68     | 1.85    |
| PS3      | 57             | 30     | 1.90    |
| ESC/P2   | 5              | 5      | 1.00    |
| FX       | 0              | 0      | 0.00    |
| I1239X   | 0              | 0      | 0.00    |
| Other    | 6              | 6      | 1.00    |
| Total    | 735            | 302    | 2.43    |

FIG. 4

|  | JOB | PAGE | AVERAGE |
|---|---|---|---|
| 1-2Page | 400 | 530 | 1.33 |
| 3-4Page | 180 | 666 | 3.70 |
| 5-10Page | 100 | 700 | 7.00 |
| 11-20Page | 30 | 390 | 13.00 |
| 21-50Page | 14 | 460 | 32.86 |
| 51-100Page | 8 | 544 | 68.00 |
| Over100Page | 3 | 476 | 158.67 |
| Total | 735 | 3766 | 5.12 |

PRINTER

CROSS-REFERENCE TO RELATED APPLICATIONS

The entire disclosure of Japanese Patent Application No. 2007-336220, filed Dec. 27, 2007, is expressly incorporated by reference herein.

BACKGROUND OF THE INVENTION

1. Field of the Invention

The present invention relates to a printer, and more particularly to such a printer which selects a language translation program corresponding to a printer control language in analysis of a printing job described on the basis of the printer control language, executing the program on a memory and printing based on a result of analysis obtained by the execution of the program.

2. Description of the Related Art

A printer control language has conventionally been used to instruct a printer to generate a print image of print data originated by a terminal. When a plurality of terminals are connected via a network to a printer, different languages are sometimes used by the terminals. The printer is provided with a plurality of language translation programs in order to handle the plural languages used by the respective terminals. For example, refer to Japanese patent application publication, JP-A-2003-29946.

However, an execution environment of the language translation program becomes a problem when a printer is provided with a plurality of language translation programs. A language translation program is normally read onto a memory in the printer and executed on the memory. Accordingly, for the purpose of quick processing of transmitted print, it is desirable that different language translation programs should remain resident on the memory. However, a memory with a large capacity needs to be used in order that a plurality of language translation programs may remain resident on the memory. Thus, use of a large capacity memory is not realistic in view of cost problems. Accordingly, use frequencies of language translation programs have conventionally been obtained, so that only the language translation program with a highest use frequency has remained resident in a memory. Refer to Japanese patent application publication, JP-A-H11-194907, for example.

However, when a language translation program is selected on the basis of only the use frequency, the selection does not sometimes cope with an actual use status of language translation program.

SUMMARY

The present invention provides a printer in which a real use status of language translation program is analyzed, and a memory is efficiently used.

According to one aspect of the present invention, there is provided a printer which, in analyzing a print job described in a printer control language, selects a language translation program corresponding to the printer control language and executes the language translation program on a memory, and carries out printing based on a result of analysis of the language translation program, the printer comprising a use status computation section which collects statistics of a use status of the analyzed print job and computes a use frequency and an execution interval of the language translation program based on a result of the statistics, and a resident mode switching section which causes a language translation program with a highest use frequency to initially stay resident in the memory and further causing another language translation program with a high use frequency and a long execution interval to stay resident next to the language translation program with the highest use frequency in the memory.

According to the aforesaid aspect of the invention, a language translation program corresponding to a printer control language is selected and executed on a memory of the printer. The printer executes printing based on a result of analysis of the language translation program. In the printer, a use status computation section collects statistics of a use status of the analyzed print job and computes a use frequency and an execution interval of the language translation program based on a result of the statistics. A resident mode switching section causes a language translation program with a highest use frequency to initially stay resident in the memory. The resident mode switching section further causes a language translation program with a high use frequency and a long execution interval to state resident next to the language translation program with the highest use frequency in the memory. Consequently, the language translation program to be caused to stay resident in the memory can be selected on the basis of the use frequency and the execution interval to state resident next to the language translation program with the highest use frequency in the memory. Thus, the memory can be used efficiently. The use frequency here refers to the number of times at which the language translation program is executed in a given period of time. Furthermore, the execution interval refers to a time length in which the language translation program is consecutively used.

It is preferable that the use frequency computation section measures the number of print jobs processed based on the language translation program and the number of times at which the language translation program is read into the memory for execution thereof, collecting the statistics based on the measurement, the use frequency computation section further computing the use frequency based on a result of statistics of the number of print jobs and the execution interval based on a result of statistics of the number of times at which the language translation program is read into the memory.

According to the above-described arrangement, the use frequency is computed on the basis of the statistical result of the number of print jobs, and the execution interval is computed on the basis of the statistical result of the number of times at which the language translation program is read into the memory. Thus, since the use status of the language translation program is determined from a processing status of the print job, the more substantial use status of the language translation program can be determined.

It is also preferable that the use status computation section computes an available capacity of the memory based on a memory usage of the language translation program, and when the computed available capacity of the memory is smaller than a predetermined value, the language translation program is read into the memory upon initiation thereof. According to the above-described arrangement, when the available capacity of the memory is smaller, the language translation program is not caused to stay resident in the memory but is read into the memory upon initiation thereof. Consequently, the memory can effectively be used even when the available capacity of the memory is smaller.

It is further preferable that the resident mode switching section computes the memory usage based on the number of print pages executed in the print job. The memory usage of the language translation program can easily be computed on the basis of the number of pages to be processed. For example, the memory usage can be estimated by easier computation when the memory usage is weighted according to an average number of pages to be processed, whereupon the available capacity of the memory can be estimated.

According to another aspect of the invention, there is provided a printer which, in analyzing a print job described in a printer control language, selects a language translation program corresponding to the printer control language and executes the language translation program on a memory, and carries out printing based on a result of analysis of the language translation program, the printer comprising a use status computation section which collects statistics of a use status of the analyzed print job and computes a use frequency and an execution interval of the language translation program based on a result of the statistics, and a use status display section which displays the use frequency and the execution interval both computed by the use status computation section.

According to the above-described aspect of the invention, the use status display section displays the use frequency and the execution interval of the language translation program based on the statistical result of the use status of the print job. When confirming the use frequency and the execution interval both displayed, the user can assist in determining the language translation program to be caused to stay resident in the memory.

It is preferable that the use status display section generates a histogram based on contents of processing in the print job, and the generated histogram is printed as a status sheet. According to the above-described arrangement, when confirming the printed status sheet, the user can obtain information for determination of the language translation program to be caused to stay resident in the memory.

It is preferable that the use status display section generates histograms based on a use frequency, an execution interval of the language translation program and the number of the print pages executed in the print job processed on the language translation program respectively. According to the above-described arrangement, the histograms generated based on the use frequencies are displayed when the user wishes to determine the language translation program to be caused to stay resident in the memory. Also, the histograms are used both when the user wishes to determine the language translation program based on the execution intervals of the language translation programs and when the user wishes to determine the language translation program based on an amount of data obtained from the number of pages to be printed. Consequently, information according to the material for determination can be presented as a histogram to the user.

BRIEF DESCRIPTION OF THE DRAWINGS

FIG. 3 illustrates contents of data base stored on a non-volatile memory;

FIG. 4 illustrates other contents of the data base stored on the non-volatile memory;

DETAILED DESCRIPTION

One embodiment of the present invention will be described in the following sequence:
1. An embodiment:
1.1. Arrangement of a printer:
1.2. Statistical processing regarding use status;
1.3. Status sheet output processing;
1.4. Resident mode switch processing;
1.4.1. Processing upon power supply;
1.4.2. Processing upon start of printer control language; and
2. Other embodiments

1. FIRST EMBODIMENT 1.1. Arrangement of a Printer

Figure 1:
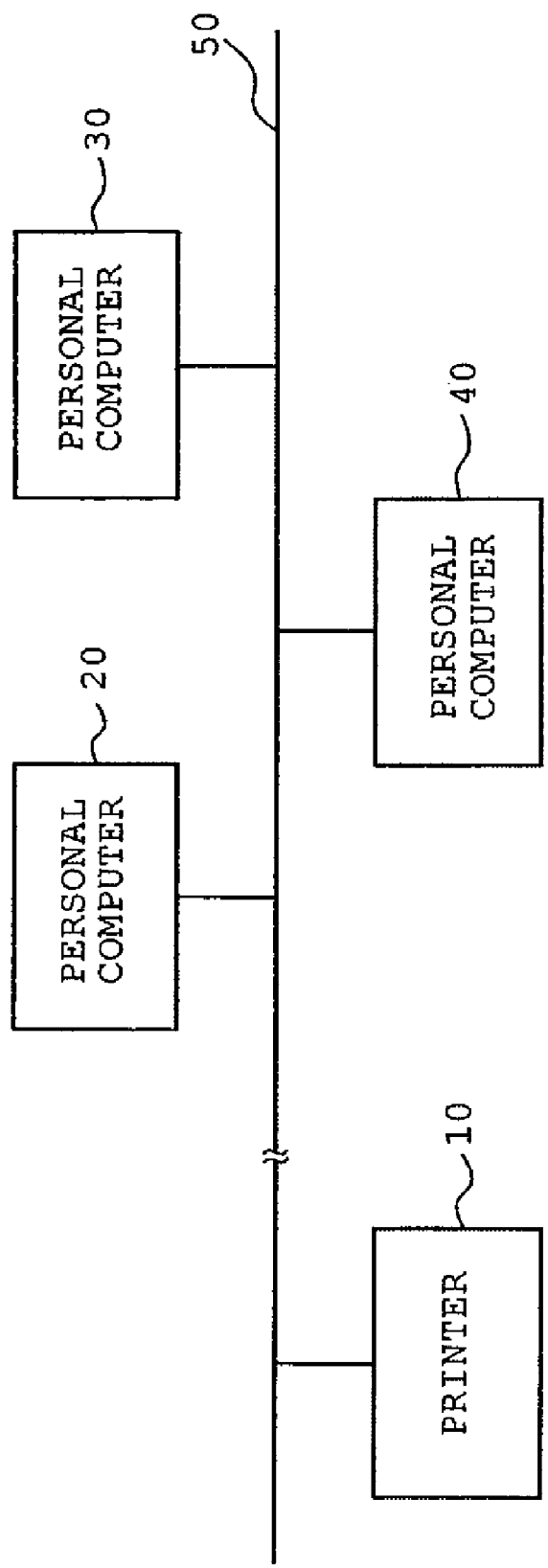
FIG. 1 is a schematic block diagram of a printer 10 connected to a network in one embodiment in accordance with the present invention.

FIG. 1 shows a printer connected to a network. The printer 10 is connected via the network 50 to personal computers (hereinafter, "PC") 20 to 40 to receive via the network 50 print data transmitted from the PCs 20 to 40. Each of the PCs 20 to 40 includes a print data generating section and a printer driver. The printer driver converts print data generated by the print data generating section into print data with the use of a predetermined printer control language. The printer 10 stores a language translation language program corresponding to a printer control language used by each of the PCs 20 to 40. When executing print processing based on print data, the printer 10 selects the language translation program corresponding to each printer control language, executing the selected language translation program.

Figure 2:
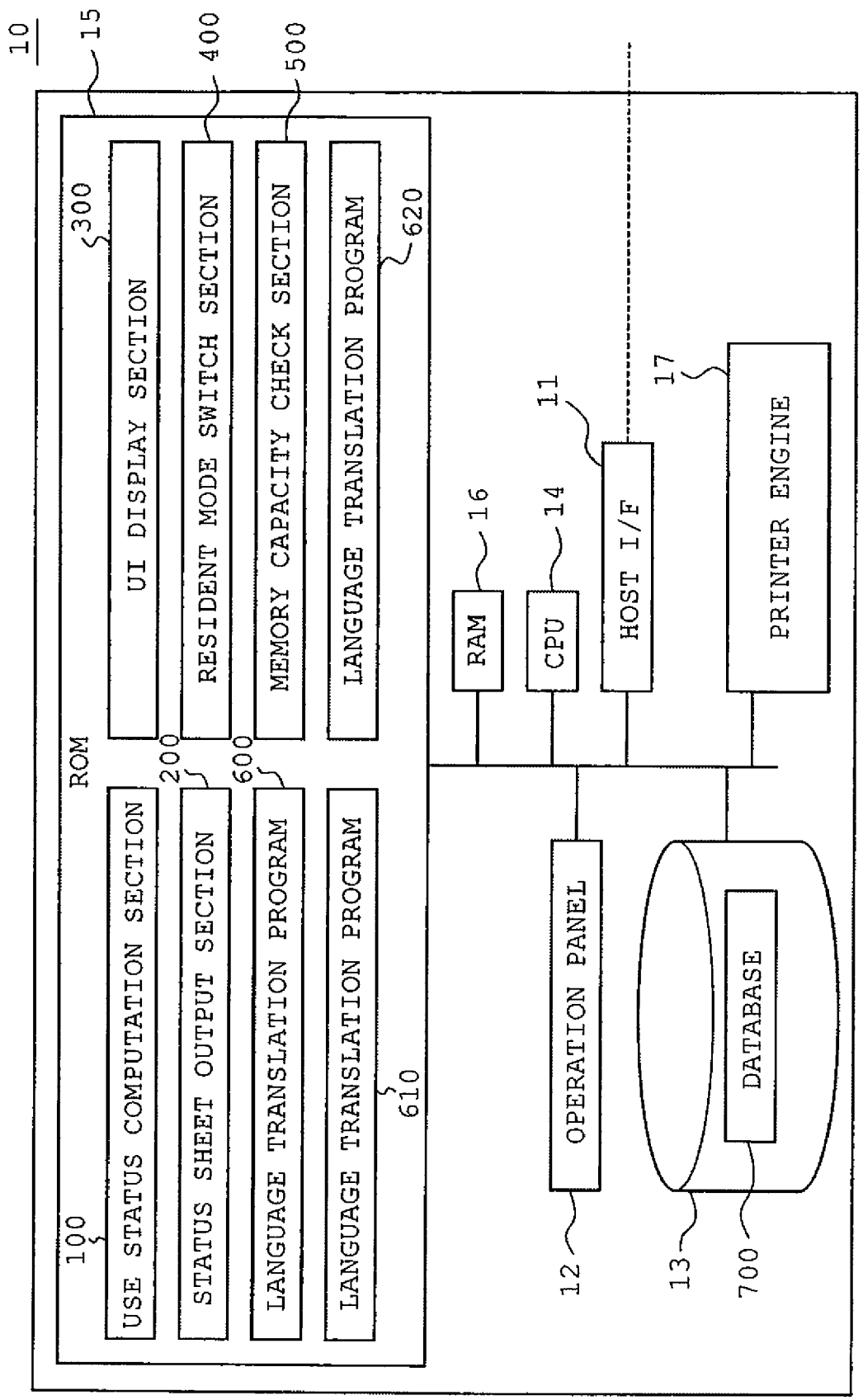
FIG. 2 is a block diagram of the printer 10, showing an electrical arrangement thereof.

FIG. 2 shows an electrical arrangement of the printer 10. The printer 10 is connected via a host interface (I/F) 11 to the network 50 to receive print data via the network 50, executing print processing. The printer 10 includes a nonvolatile memory 13 storing predetermined database, a central processing unit (CPU) 14 controlling drive of the printer 10, a read only memory (ROM) 15 storing programs on which the CPU 14 is caused to carry out predetermined processing, a random access memory (RAM) 16 where a program is expanded, and a printer engine 17 for carrying out printing process. The above-described components are connected to one another by a bus 18 for intercommunication.

The ROM 15 stores a program which causes the CPU 14 to execute various processes. More specifically, the ROM 15 stores a use status computation program (a use status computation section) 100 on which statistics are taken regarding a used status of a print job processed on the language translation program, a status sheet output program (a status sheet output section) 200 on which a status sheet is printed when the ROM 15 has received instructions from a user, an user interface (UI) display program (a UI display section) 300 on which an operation screen is displayed on each of the PCs 20 to 40, a resident mode switch program (a resident mode switch section) 400 on which a language translation program resident on the RAM 16 is switched from one to another, a memory capacity check program (a memory capacity check section) 500 on which a memory capacity of the RAM 16 is checked, and language translation programs 600 to 620. The ROM 15 stores each of the aforesaid programs in its compressed state. Each compressed program is expanded on start and read into the RAM 16 thereby to be executed.

Print data delivered from the PC 20 is transmitted via the network 50 to the printer 10, where the print data is stored via the host I/F 11 onto the RAM 16. The CPU 14 reads a language translation program from the ROM 15 into the RAM 16. The read language translation program corresponds to a printer control language constituting the print data stored on the RAM 16. The CPU 14 carries out analysis of the printer control language with the use of the corresponding language translation program. After analysis, the CPU 14 drives the printer engine 17 according to a result of the analysis, thereby executing the print processing.

Furthermore, the printer 10 counts a use status of the print job processed on the language translation program every time executing the language translation program and collects the statistics of the use status of the print job based on the obtained count (a use status statistics process). The printer 10 stores data of the counted use status on the nonvolatile memory 13 and obtains by computation a use frequency and execution interval of the language translation program based on the stored result of the statistics. The printer 10 records the obtained use status and execution interval on a status sheet printed by the printer engine 17, thereby providing a material for determination of a resident mode of printer control language to the user checking the status sheet (a status sheet output process) Additionally, the printer 10 uses the obtained use status and an execution interval when the language translation program to stay resident on the RAM 16 is automatically switched (a resident mode switch process).

Figures 5, 6:
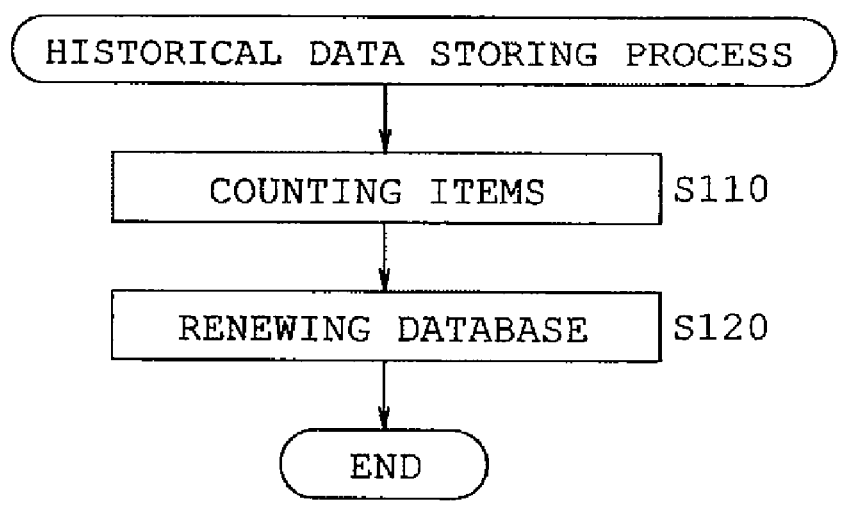
FIG. 5 illustrates other contents of the data base stored on the non-volatile memory.
FIG. 6 is a flowchart showing a statistical processing regarding the use status.

FIGS. 3 to 5 illustrate databases stored on the nonvolatile memory 13. The nonvolatile memory 13 stores data of statistical values of use status of print job in the form of database. More specifically, database 700 records data of the cumulative number of print jobs processed on each language translation program, the cumulative number of print pages, an amount of data processed by the print job, an amount of data of each language translation program, an average amount of data per page processed by each language translation program, and a memory capacity of the RAM 16.

The database 700 stores data of the cumulative number of print jobs processed on each language translation program in order that a use frequency of each language translation program may be determined. The use frequency means the number of times at which each language translation program is executed during a predetermined period of time. The use frequency becomes higher as the cumulative number of print jobs is increased. The database 700 records data of the cumulative number of print jobs processed on each language translation program and the cumulative number of pages printed on the language translation programs as shown in FIG. 3. Data of the cumulative number of print jobs is used for determination of a use frequency. An average number of pages per print job is obtained when the cumulative number of pages is divided by the cumulative number of print jobs. Accordingly, the use frequency may be determined using the obtained average number of pages.

The database 700 stores data of the cumulative number of times of read-in of each language translation program onto the RAM 16 in order that an execution interval of each language translation program may be determined. The execution interval means a time length between executions of continuously used language translation programs. The execution interval becomes shorter as the number of times of read-in is increased. The database 700 records data of the cumulative number of print jobs and the cumulative number of times of read-in as shown in FIG. 4. Data of the cumulative number of times of read-in is used for determination of the execution interval. An execution interval may be determined using the value obtained by dividing the cumulative number of times of read-in by the cumulative number of times of read-in.

Furthermore, the database 700 records data of cumulative number of print jobs for every print page to re processed and the cumulative number of pages in order that an amount of data to be executed by the print job may be determined, as shown in FIG. 5. Data of the cumulative number of print jobs and the cumulative number of pages is used in a status sheet output process.

The following describes the use status statistic process, the status sheet output process and resident mode switch process sequentially in this order.

1.2. Use Status Statistic Process

In the use status statistic process, the CPU 14 counts each use status of print job processed on the language translation program for every execution of the printer control language, storing data of obtained values onto the nonvolatile memory 13. The use status statistic process is executed by a use status computation section 100 read into the RAM 16. Values obtained by the counting are utilized as a material for determination of the use frequency and the execution interval of the language translation program.

FIG. 6 shows the use status statistic process. When print data is read into the RAM 16, the CPU 14 analyzes a printer control language based on the language translation program. The CPU 14 reads the language translation program into the RAM 16 based on the results of analysis, executing the use status statistic process. In the use status statistic process, the CPU 14 counts the number of processed print jobs, the number of times of read-in and the number of pages printed by a print job (step S110).

The CPU 14 stores data of each value obtained by the counting onto the nonvolatile memory 13 (step S120). Items corresponding to each language translation program in the database 700 are replaced by the values obtained by the counting, thereby being renewed. The statistical results are cumulatively stored by the renewal process. The counting of each value is executed for every execution of the language translation program, whereby the use status computation section 100 causes the CPU 14 to realize the use status computation section.

1.3. Status Sheet Output Process

In the status sheet output process, the CPU 14 controls the printer engine 17 to print a status sheet. The status sheet records data of use status of print jobs processed on each language translation program. On the status sheet is stored data of a histogram depicting the values of the number of print jobs, the number of times of read-in and the number of pages printed by each print job, all of which are recorded on the database 700. As a result, the user determines a use frequency and an execution interval of the language translation program when confirming the status sheet.

Figure 7:
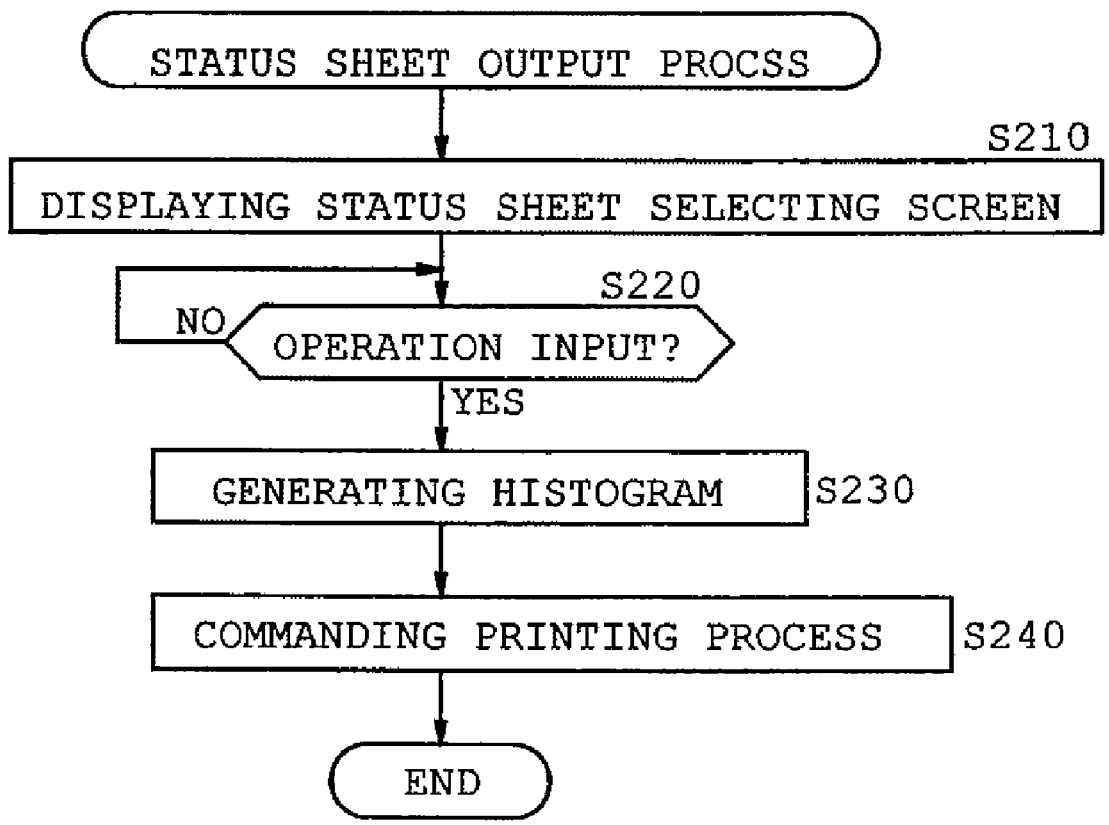
FIG. 7 is a flowchart showing a status sheet output processing.

FIG. 7 is a flowchart showing the status sheet output process. In the status sheet output process, a status sheet printing instruction is delivered to the printer 10 when the user operates the operation panel 12 or one of the PCs 20 to 40. The CPU 14 of the printer 10 reads the status sheet output section 200 from the ROM 15 into the RAM 16 based on the instruction.

When accepting the status sheet printing instruction, the CPU 14 displays a status sheet selecting screen on which the user selects a status sheet to be printed (step S210). When the CPU 14 reads the UI display section 300 stored on the ROM 15 into the RAM 16, the UI display section 300 displays the status sheet selecting screen. More specifically, the status sheet selecting screen is displayed on a screen of the PC from which the status sheet printing instruction has been delivered. When the user operates an icon on the screen of the PC, a selected status sheet is printed.

Figure 8:
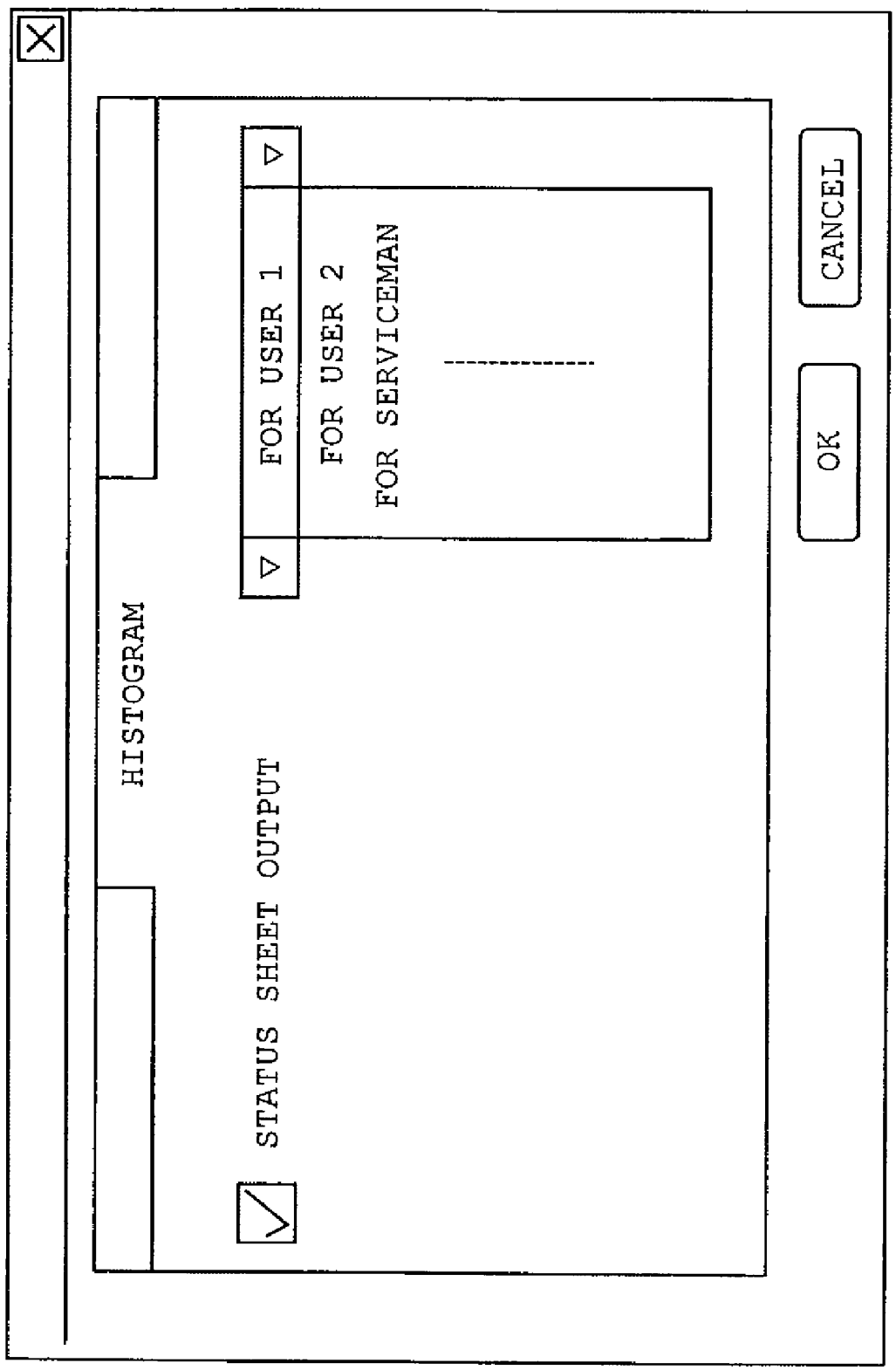
FIG. 8 shows a status sheet selecting screen for selecting a status sheet to be displayed on the screen.

FIG. 8 shows the status sheet selecting screen displayed on the screen. As shown, a character string of "STATUS SHEET OUTPUT" is displayed on a central area of the screen. A pulldown menu of selectable types of status sheets is displayed on the right of the character. "FOR USER 1," "FOR USER 2" and "FOR SERVICEMAN" are adapted to be displayed as examples of selectable status sheets. Histograms to be printed on the respective status sheets differ from one another according to usages of the histograms. The user selects a status sheet to be printed from the pulldown menu and then operates an icon of "OK," thereby delivering to the printer 10 an instruction to print the selected status sheet.

Upon receipt of the selecting instruction the user has delivered using the status sheet screen (step S220), the CPU 14 generates the status sheet while referring to the database 700 stored on the nonvolatile memory 13 (step S230). The CPU 14 refers to a statistical result recorded on the database 700, generating a histogram to be recorded on the status sheet. Subsequently, the CPU 14 instructs the printer engine 17 to execute a histogram printing process (step S240).

Figure 9:
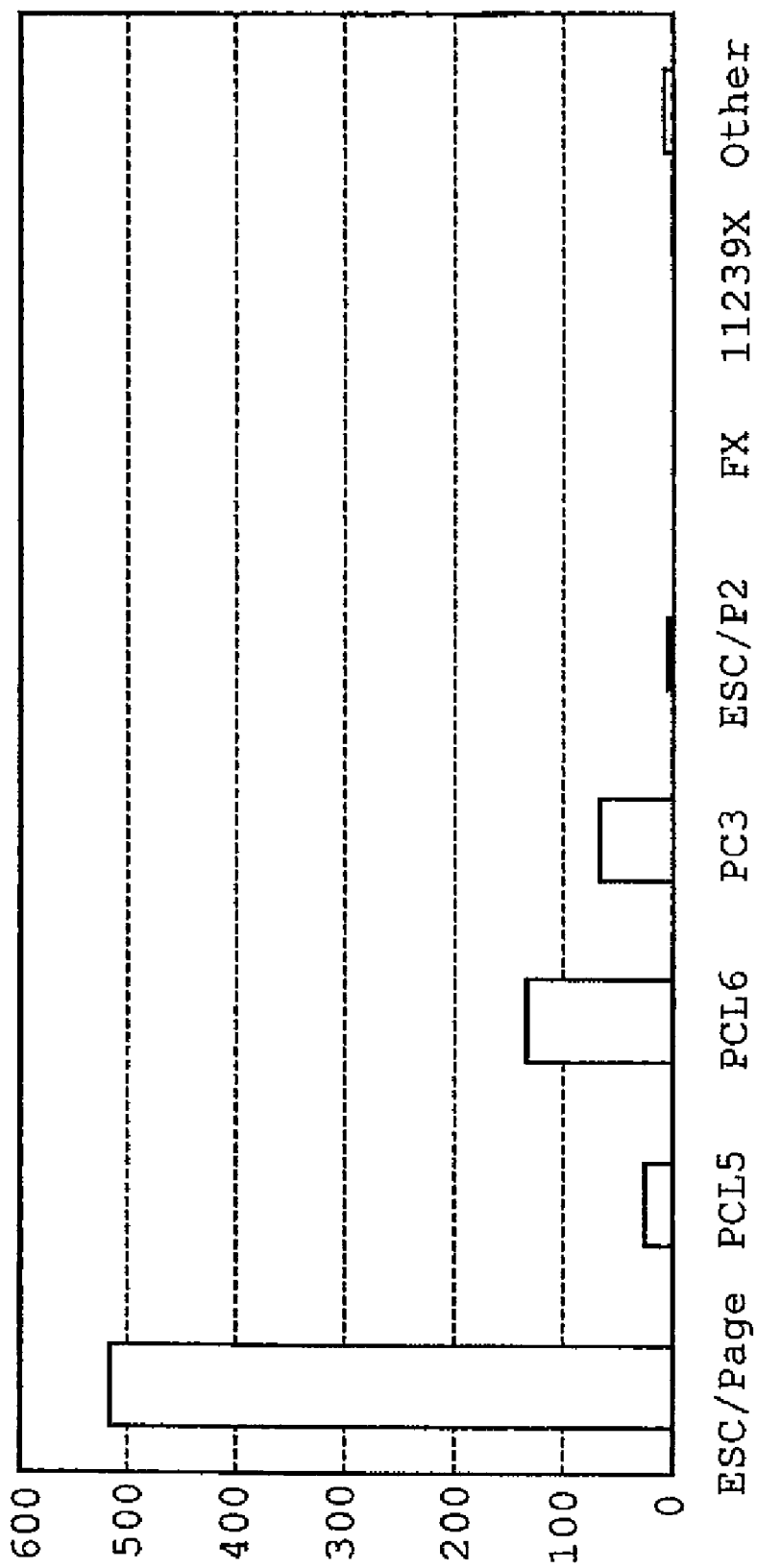
FIGS. 9 to 11 show histograms to be registered on the status sheet respectively.
Figure 10:
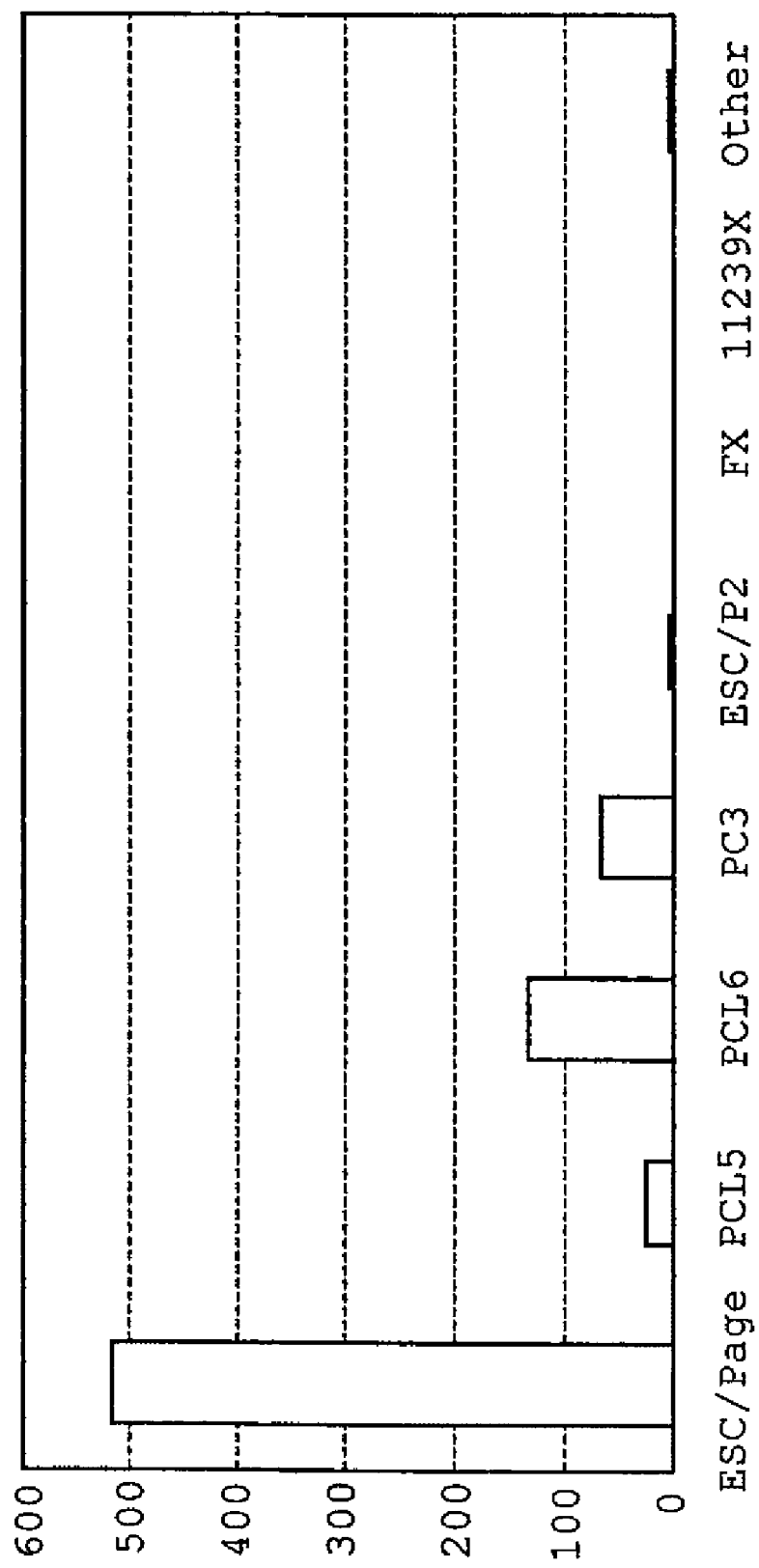
Figure 11:
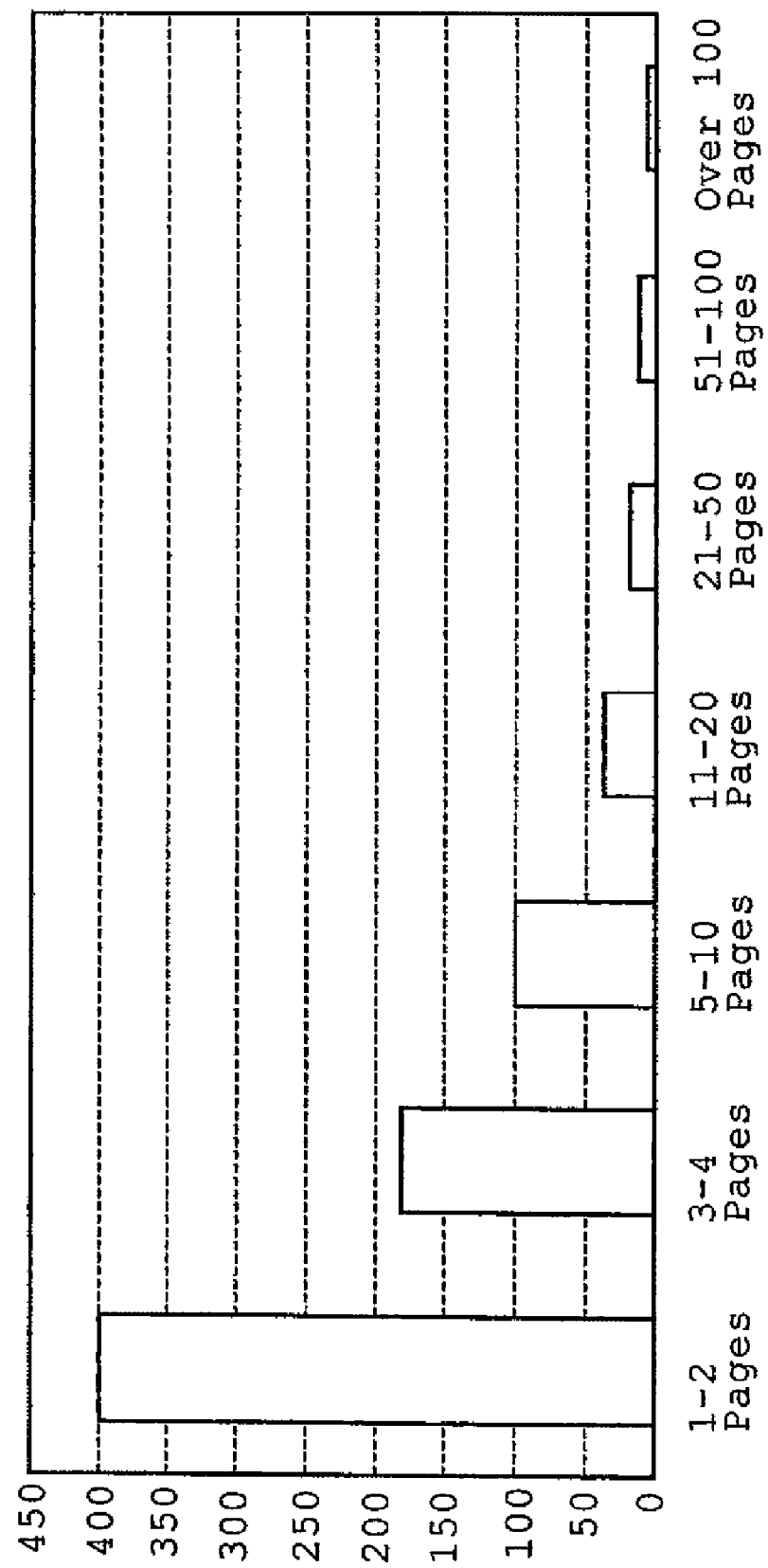

FIGS. 9 to 11 show histograms recorded on status sheets respectively. FIG. 9 shows the status sheet to be printed when the "FOR USER 1" has been selected on the status sheet selecting screen. The status sheet is generated on the basis of the statistical result as shown in FIG. 3. A histogram recorded on the status sheet indicates a cumulative number of print jobs processed by each language translation program. Furthermore, the status sheet is used when the user determines a language translation program to stay resident on the RAM 16 based on the use frequency thereof.

FIG. 10 shows the status sheet to be printed when the "FOR USER 2" has been selected on the status sheet selecting screen. The status sheet is generated on the basis of the statistical result as shown in FIG. 4. A histogram recorded on the status sheet indicates a cumulative number of times of read-in of each language translation program into the RAM 16. Furthermore, the status sheet is used when the user determines a language translation program to stay resident on the RAM 16 based on the execution interval thereof.

FIG. 11 shows the status sheet to be printed when the "FOR SERVICEMAN" has been selected on the status sheet selecting screen. The status sheet is generated on the basis of the statistical result as shown in FIG. 5. A histogram recorded on the status sheet indicates the number of print jobs for every print page. The serviceman refers to the histogram in the case of failure diagnosis of the printer 10. Calibration of the printer engine 17 is normally carried out in the printer every time one print job has been processed. Accordingly, the number of times of calibration during a predetermined time period is increased when the number of print jobs in each of which the number of sheets of paper to be processed is small. The serviceman refers to the number of times of calibration recorded on the status sheet, whereupon a result of reference can be used for failure diagnosis of the printer engine 17.

Thus, the status sheet indicative of the use status of the language translation program can be printed in the invention. The users and the like can get information about the use status and execution interval of the language translation program from the status sheet, whereby the users and the like can use the information as a material for determining which of the language translation programs should stay resident on the RAM 16. In other words, the status sheet output section 200 causes the CPU 14 to accomplish a use status display.

1.4. Resident Mode Switching Process

In the resident mode switching process, the CPU 14 selects a language translation program to stay resident on the RAM 16 based on the values the data of which is stored on the nonvolatile memory 13. A language translation program to stay resident on the RAM 16 is also selected on the basis of the statistical result of use status of each print job recorded on the database 700 in the resident mode switching process in the same manner as in the status sheet output process. Furthermore, when operating the operation panel 12 or the PC, the user can determine whether the resident mode switching process should be carried out. When the language translation program to stay resident on the RAM 16 is determined by the user on the basis of his/her determination, the resident mode switching process is kept off, and the user makes a determination while referring to the status sheet. The resident mode switching process is executed both when a main power supply of the printer 10 is turned on and when the language translation program starts up. These two cases will be described.

1.4.1. Processing at the Time of Power Activation

Figure 12:
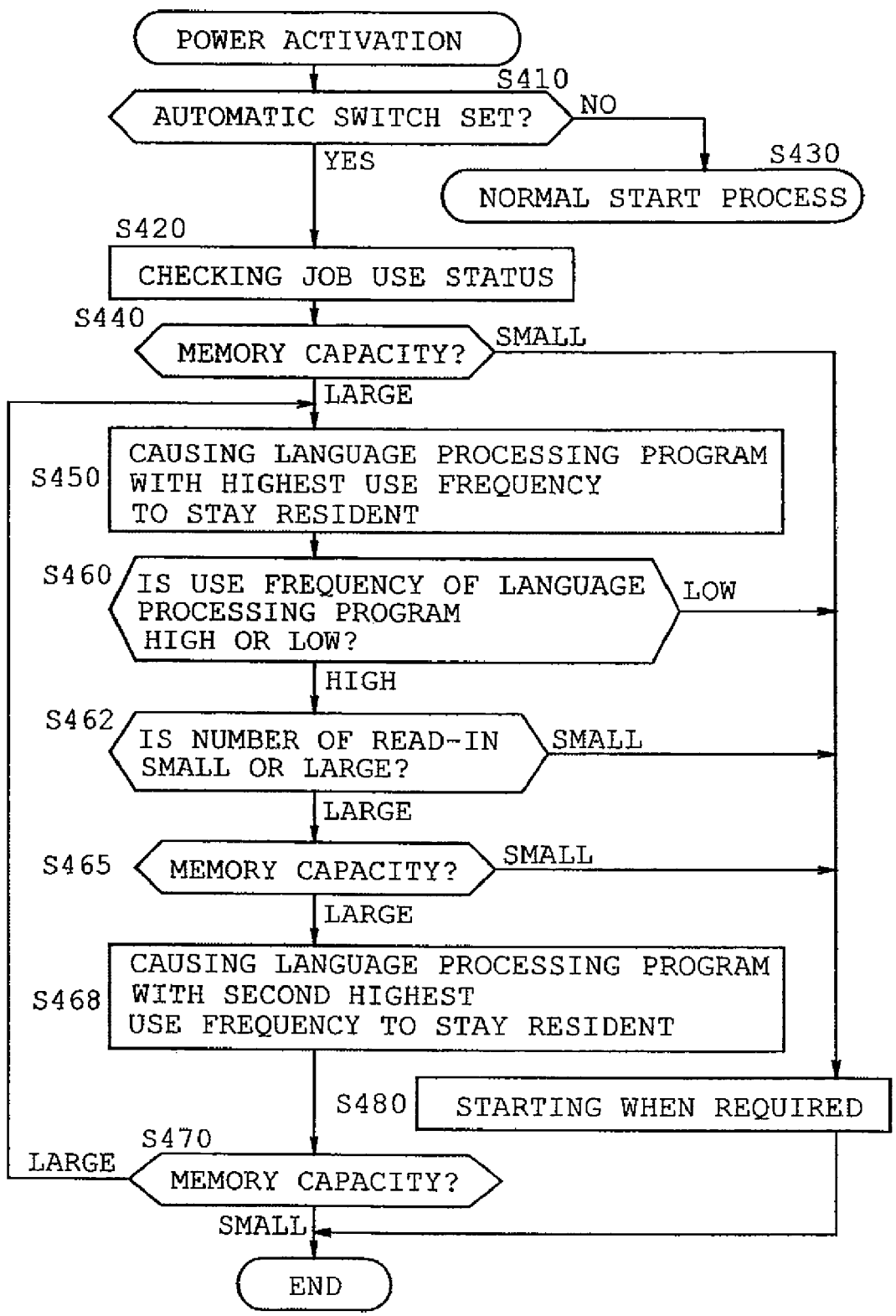
FIG. 12 is a flowchart showing a resident mode switch processing executed upon power supply.

FIG. 12 is a flowchart showing a resident mode switching process executed at the time of power activation. When the user operates the operation panel 12 for power activation of the printer 10, the CPU 14 reads the resident mode switching section 400 into the RAM 16 so that the resident mode switching process is executed. In this case, it is assumed that the language translation programs 600 to 620 are stored on the ROM 15 in compressed forms.

Upon power activation of the printer 10, the CPU 14 determines whether the printer 10 is in a mode allowing the printer 10 to execute the resident mode switching process (step S410). When the user has previously set the resident mode switching process in an off-state, the CPU 14 carries out a normal start process without execution of the resident mode switching process (step S430).

The CPU 14 accesses the nonvolatile memory 13 to refer to the database recorded on the nonvolatile memory 13 (step S420). In this case, the CPU 14 reads from the database a statistical result of use status regarding the print jobs corresponding to the language translation programs 600 to 620. Furthermore, the CPU 14 reads out data of a data amount of each language translation program, an average data amount per page processed by each language translation program and a memory capacity of the RAM 16, all of which is stored on the nonvolatile memory 13.

The CPU 14 computes an available memory $M_{heap}'$ of the RAM 16 based on items read from the nonvolatile memory to determine whether the available memory is large (step S440). More specifically, the CPU 14 reads the memory capacity check section 500 from the ROM 15 to execute the section 500 so that an available capacity $M_{heap}'$ of the RAM 1 is computed. The available capacity $N_{heap}'$ thus computed has a value required when each language translation program is executed on the RAM 16. The available capacity $N_{heap}'$ is obtained from the undermentioned equation (1).

Figure 13:
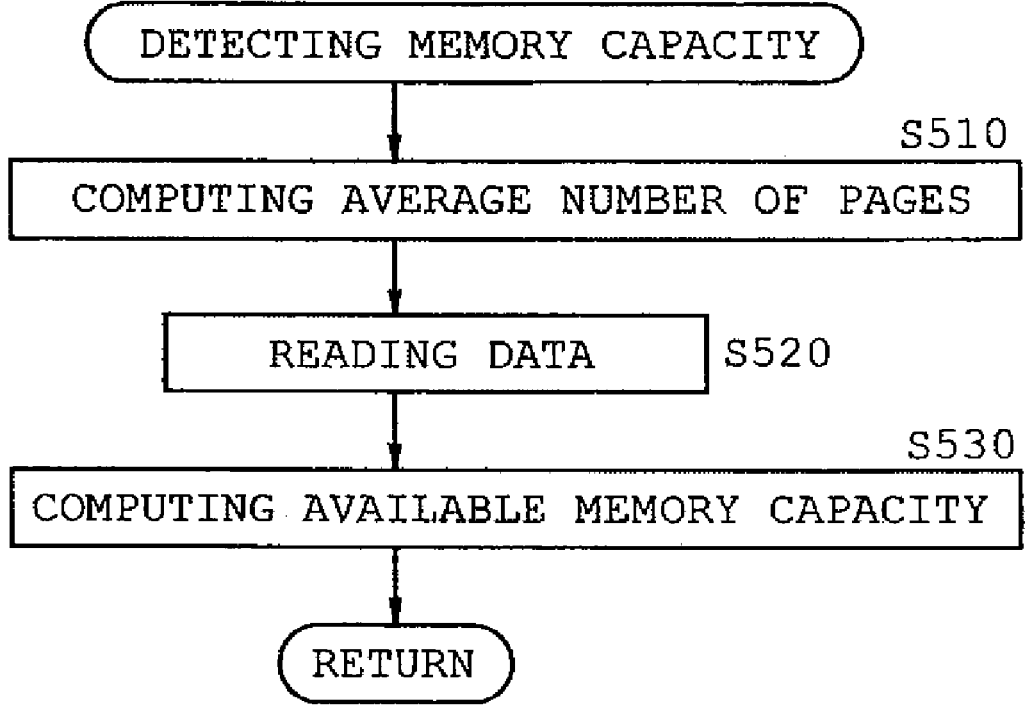
FIG. 13 a flowchart showing a memory capacity confirmation process.

FIG. 13 is a flowchart showing the memory capacity check process executed on the basis of the memory capacity check section. Firstly, the CPU 14 computes an average number of pages AVGpage from the cumulative number of print jobs and cumulative number of pages both recorded on the database 700 (step S510). The average number of pages AVGpage is to be processed in the print job. Subsequently, the CPU 14 reads an data amount Dp of each language translation program, an average data amount Davgp per page and the memory capacity Mheap of the RAM 16 from the database 700 (step S520). Finally, the CPU 14 computes the available capacity Mheap' using the equation (1) (step S530). "Memory capacity" in the flowchart of FIG. 13 means the available capacity Mheap'.

Available capacity=(memory capacity of memory area of RAM)−(data amount of the language translation program+ average data amount used per page×average number of pages per print job)

$$Mheap'=Mheap-(Dp+Davgp \times AVGpage) \quad (1)$$

The CPU 14 computes the available capacity Mheap' for each of the language translation programs 600 to 620, temporarily storing the obtained values on the RAM 16.

When determining that the obtained available capacity Mheap' is larger than a predetermined value, the CPU 14 further determines the printer control language to stay resident on the RAM 16 on the basis of judgments under various conditions to be considered (steps S450 to S490). In this case, the CPU 14 determines a use frequency and an execution interval of each language translation program based on the statistical result the data of which is stored on the database 700. In the embodiment, when the cumulative number of print jobs read from the database 700 is larger than a predetermined value, the CPU 14 determines that the use frequency is high. When the cumulative number of read-in is larger than a predetermined value, the CPU 14 determines that the execution interval is short.

When determining at step S440 that the available capacity Mheap' is large, the CPU 14 further determines whether one or more language translation programs stay resident on the RAM 16 (step S450). A smallest value in the obtained available capacity values is used as the available capacity Mheap'. When the available capacity Mheap' is larger, the CPU 14 causes the language translation program with the highest use frequency to stay resident in the RAM 16 (step S460). If the language translation program 600 has the highest use frequency, the language translation program 600 is caused to stay resident on the RAM 16.

When the available capacity Mheap' is small, the CPU 14 causes no language translation program to stay resident on the RAM 16, terminating the resident language selecting process (step S480). In this case, the language translation program is read into the RAM 16 to be executed ever time of start.

Furthermore, the CPU 14 determines whether the language translation programs 610 and 620 both stored on the ROM 15 should stay resident on the RAM 16. More specifically, the CPU 14 determines a language translation program subsequently to stay resident based on a use frequency of the program. Assume now that the language translation program 610 has a higher use frequency than the language translation program 620. The CPU 14 compares the use frequency of the language translation program 610 with a threshold T1. When the use frequency is lower than the threshold T1 (step S460), the language translation program 610 is not caused to stay resident on the RAM 16 but read into the RAM 16 every time of start (step S480).

Furthermore, when the use frequency of the language translation program 610 is higher than the threshold T1 but the number of times of read-in thereof is smaller (step S462), the CPU 14 does not cause the language translation program 610 to stay resident on the RAM 16 (step S480). The number of times of read-in is considered since the number is related to a start time of the printer 10. More specifically, when a language translation program with a large number of times of read-in is read into the RAM 16, the time necessary for read-in is increased, whereupon a processing time is delayed. Furthermore, the language translation program 600 with the highest use frequency is already resident on the RAM 16, and the language translation program 610 with the second highest use frequency does not affect the whole processing time even when dynamically read into the RAM 16 every time of start. Accordingly, the language translation program 610 is caused to stay resident on the RAM 16 when the number of times of read-in thereof is large. However, the language translation program 610 is read into the RAM 16 every time of startup thereof when the number of times of read-in thereof is small.

Furthermore, when the available capacity of the RAM 16 is small though the language translation program has a high switching frequency (step S465), the CPU 14 does not cause the language translation program to stay resident on the RAM 16 (step S480). An available capacity of the RAM 16 to be determined in this case is equal to a value obtained by subtracting the memory capacity of the language translation program 610 from the available capacity Mheap' obtained at step S430 with the fact that the language translation program 600 has already been resident being taken into consideration.

Thereafter, when the available capacity Mheap' of the RAM 16 is large (step S470), the CPU 14 returns to step S450 to determine whether the language translation program 620 should stay resident on the RAM 16. As a result, the CPU 14 can select the language translation program to stay resident on the RAM 16 based on the use frequency and the execution interval of the language translation program.

1.4.2. Processing Upon Start of Printer Control Language

Figure 14:
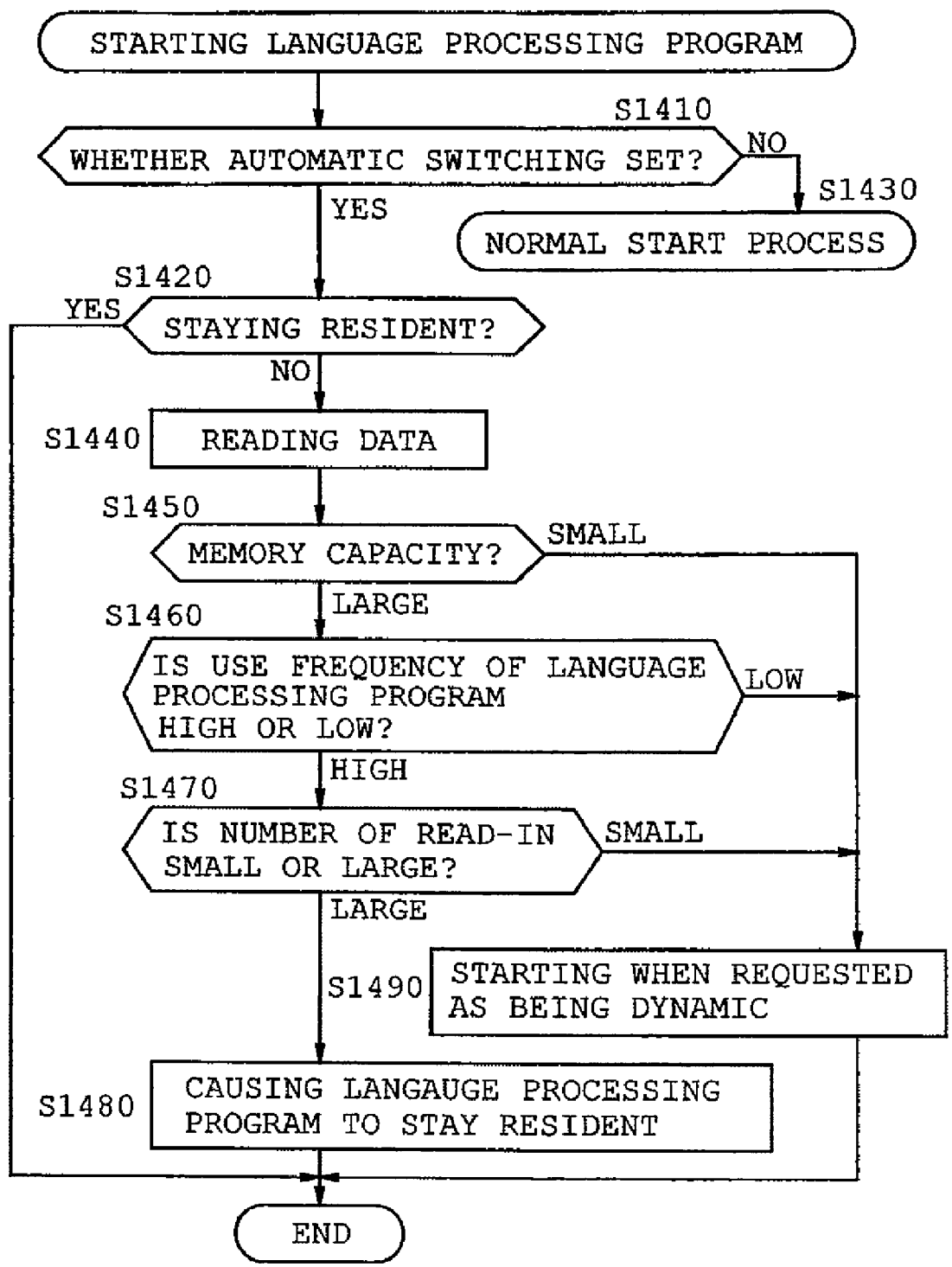
FIG. 14 is a flowchart showing a resident mode switch processing executed every time of start of a language translation program.

FIG. 14 is a flowchart showing a resident mode switch processing executed every time of startup of a language translation program. The processing shown in the flowchart is executed by the CPU 14 every time of start of the language translation program. Large part of the processing shown in FIG. 14 is similar to the processing as shown in FIG. 12. Only the differences will mainly be described hereinafter.

Upon start of a given language translation program, the CPU 14 determines whether the printer 10 is in the mode allowing the CPU 14 to execute the resident mode switching process (step S1410). When the user has turned off the resident mode switching process, the CPU 14 carries out a normal starting process without execution of the resident mode switching process (step S1430).

The CPU 14 determines whether the started language translation program is resident on the RAM 16 (step S1420). More specifically, the CPU 14 determines whether the started language translation program has been read from the ROM 15 into the RAM 16 or whether the started language translation program has been read from the RAM 16. In this case, when the language process section stays resident on the RAM 16, the CPU 14 terminates the resident language selecting process, executing the printing process.

The CPU 14 accesses the nonvolatile memory to refer to a statistical result recorded on the database (step S1440) Furthermore, the CPU 14 computes an available memory of Mheap' of the RAM 16 (step S1450).

The CPU 14 determines the language translation program to stay resident on the RAM 16 based on the computed available memory Mheap' and various determinations (steps S1460 to S1490). In the same manner as shown in the flowchart of FIG. 12, the CPU 14 refers to the statistical result read from the database 700, computing the use frequency and the execution interval of the language translation program from the referred statistical result. In the above-described sequential flow, the CPU 14 determines whether the language translation program should stay resident on the RAM 16. As obvious from the description with reference to FIGS. 12 to 14, the resident mode switch section 400 causes the CPU 14 to accomplish a resident mode switching section.

2. OTHER EMBODIMENTS

In the above-described resident mode switching process, the CPU 14 determines the language translation program firstly to be caused to stay resident in the RAM 16 based on the use frequency. The CPU 14 may determine the language translation program based on the execution interval (the number of times of read-in), instead of the use frequency.

Furthermore, the status sheet is displayed on the screen of the PC n the status sheet output process in the foregoing embodiment. However, when the printer 10 is provided with a display, the status sheet selecting screen may be displayed on the display of the printer 10 so that the status sheet is selected with the use of the operation panel 12.

The invention should not be limited to the foregoing embodiment and the modified forms. The scope of the invention encompasses arrangements or configurations achieved by mutual substitution or changes in the combination of the arrangements disclosed in the foregoing embodiment and the modified forms of the embodiment. The scope of the invention further encompasses arrangements or configurations achieved by mutual substitution or changes in the combination of the arrangements or configurations disclosed in the description of the related art, the foregoing embodiment and the modified forms of the embodiment.

While the invention has been particularly shown and described with respect to preferred embodiments thereof, it should be understood by those skill in the art that the foregoing and other changes in form and detail may be made therein without departing from the spirit and scope of the invention as defined in the appended claims.

What is claimed is:

1. A printer which, in analyzing a print job described in a printer control language, selects a language translation program corresponding to the printer control language and executes the language translation program on a memory, and carries out printing based on a result of analysis of the language translation program, the printer comprising:
    a use status computation section which collects statistics of a use status of the analyzed print job and computes a use frequency and a number of times that the language translation program is read into the memory based on a result of the statistics; and
    a resident mode switching section which causes a language translation program with a highest use frequency to initially stay resident in the memory and further causing another language translation program with a high use frequency and a number of times of read-in that exceeds a threshold value to stay resident in the memory.

2. The printer according to claim 1, wherein the use frequency computation section measures the number of print jobs processed based on the language translation program and the number of times at which the language translation program is read into the memory for execution thereof, collecting the statistics based on the measurement, the use frequency computation section further computing the use frequency based on a result of statistics of the number of print jobs and the number of times at which the language translation program is read into the memory.

3. The printer according to claim 1, wherein the use status computation section computes an available capacity of the memory based on a memory usage of the language translation program, and when the computed available capacity of the memory is smaller than a predetermined value, the language translation program is read into the memory upon start thereof.

4. The printer according to claim 3, wherein the resident mode switching section computes the memory usage of the language translation program based on the number of print pages executed in the print job.

5. A printer which, in analyzing a print job described in a printer control language, selects a language translation program corresponding to the printer control language and executes the language translation program on a memory, and carries out printing based on a result of analysis of the executed language translation program, the printer comprising:
    a use status computation section which takes statistics regarding a use status of the analyzed print job and computing a use frequency and a number of times that the language translation program is read into the memory based on a result of the statistics;
    a resident mode switching section which causes the language translation program with a highest use frequency to initially stay resident in the memory and further causing the language translation program with a high use frequency and a number of times of read-in that exceeds a threshold value to stay resident in the memory; and
    a use status display section which displays the computed use frequency and the number of times of read-in both computed by the use status computation section.

* * * * *